(12) United States Patent
Lai et al.

(10) Patent No.: US 11,589,391 B2
(45) Date of Patent: Feb. 21, 2023

(54) COMMUNICATION DEVICE AND COLLISION DETECTION METHOD

(71) Applicant: Realtek Semiconductor Corp., HsinChu (TW)

(72) Inventors: Wei-Chi Lai, HsinChu (TW); Wei-Hsuan Chang, HsinChu (TW); Yu-Nan Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 3 days.

(21) Appl. No.: 17/521,789

(22) Filed: Nov. 8, 2021

(65) Prior Publication Data

US 2022/0272756 A1 Aug. 25, 2022

(30) Foreign Application Priority Data

Feb. 20, 2021 (TW) .................................. 11010590

(51) Int. Cl.
*H04W 24/04* (2009.01)
*H04W 74/08* (2009.01)

(52) U.S. Cl.
CPC .............................. *H04W 74/0825* (2013.01)

(58) Field of Classification Search
CPC ..... H04W 74/0825; H04L 1/18; H04L 1/1832
See application file for complete search history.

(56) References Cited

U.S. PATENT DOCUMENTS

| 7,904,777 | B2 * | 3/2011 | Singh | H04L 1/1614 |
| | | | | 714/752 |
| 8,650,448 | B2 * | 2/2014 | Li | H04L 1/1671 |
| | | | | 714/751 |
| 8,891,389 | B2 * | 11/2014 | Liu | H04W 74/0841 |
| | | | | 370/252 |
| 10,033,485 | B2 | 7/2018 | Merlin | |

(Continued)

FOREIGN PATENT DOCUMENTS

EP 2572467 B1 1/2015
WO 2017206781 12/2017

*Primary Examiner* — Ahmed Elallam
(74) *Attorney, Agent, or Firm* — Winston Hsu (57) ABSTRACT

A communication device includes a radio transceiver and a collision detection device. The radio transceiver is configured to receive a wireless signal which includes an acknowledgment packet from a wireless communication channel. The acknowledgment packet includes acknowledgment information which corresponds to a plurality of transmitted packets. The collision detection device is coupled to the radio transceiver and configured to receive the acknowledgment packet, determine whether collision has occurred in the wireless communication channel according to the acknowledgment information corresponding to the transmitted packets and accordingly generate a detection result. The collision detection device determines whether collision has occurred according to a distribution of the acknowledgment information having a predetermined acknowledgment status. When the collision detection device determines that the acknowledgment information having the predetermined acknowledgment status is concentrated in a section of the acknowledgment packet, the detection result indicates that collision has occurred.

14 Claims, 4 Drawing Sheets

(56) References Cited

U.S. PATENT DOCUMENTS

| | | | |
|---|---|---|---|
| 10,212,694 B2* | 2/2019 | Ramamurthy | H04W 72/1289 |
| 10,334,475 B2* | 6/2019 | Xi | H04L 27/2602 |
| 10,771,199 B2 | 9/2020 | Sridhara | |
| 10,820,233 B2* | 10/2020 | Son | H04W 84/12 |
| 2015/0236931 A1 | 8/2015 | Merlin | |
| 2015/0319767 A1* | 11/2015 | Azarian Yazdi | H04W 28/0242 |
| | | | 370/252 |

* cited by examiner

| 1 | 1 | 1 | 1 | 0 | 1 | 0 | 0 | 0 | 0 | 1 | 0 | 0 | 0 | 0 | 1 | 0 | 0 | 1 | 1 | 1 | 1 | 1 | 1 | 1 | 1 |
|---|---|---|---|---|---|---|---|---|---|---|---|---|---|---|---|---|---|---|---|---|---|---|---|---|---|
| Number of errors within the sliding window || | 2 | 2 | 3 | 4 | 5 | 6 | 5 | 6 | 6 | 7 | 6 | 6 | 5 | 4 | 3 | 3 | 2 | 1 | 0 | 0 |

| 1 | 0 | 1 | 0 | 0 | 1 | 1 | 1 | 0 | 0 | 1 | 1 | 0 | 1 | 0 | 1 | 1 | 1 | 0 | 1 | 1 | 0 | 0 | 1 | 1 | 0 |
|---|---|---|---|---|---|---|---|---|---|---|---|---|---|---|---|---|---|---|---|---|---|---|---|---|---|
| Number of errors within the sliding window || | 3 | 3 | 3 | 4 | 3 | 4 | 3 | 3 | 2 | 2 | 3 | 3 | 3 | 2 | 3 | 3 | 2 | 3 | 2 | 3 |

| 1 | 0 | 1 | 0 | 0 | 1 | 0 | 1 | 0 | 0 | 1 | 0 | 0 | 0 | 1 | 0 | 0 | 0 | 1 | 0 | 0 | 0 | 1 | 0 | 0 | 1 |
|---|---|---|---|---|---|---|---|---|---|---|---|---|---|---|---|---|---|---|---|---|---|---|---|---|---|
| Number of errors within the sliding window || | 5 | 6 | 5 | 6 | 6 | 5 | 5 | 6 | 6 | 5 | 6 | 6 | 6 | 6 | 6 | 6 | 6 | 5 | 6 |

COMMUNICATION DEVICE AND COLLISION DETECTION METHOD

BACKGROUND OF THE INVENTION

1. Field of the Invention

The invention relates to mechanisms applicable to a communication device for detecting collision and adjusting transmission parameters, more particular to collision detection methods for effectively detecting collision and the corresponding transmission parameter adjusting methods which effectively reduce occurrence of collisions.

2. Description of the Prior Art

Carrier Sense Multiple Access (CSMA) and Collision Avoidance (CA) are the methods to avoid or reduce occurrence of collisions in a wireless communication system. However, the CSMA and CA mechanism cannot completely avoid the influence of collisions or interference on the overall transmission. Especially, in the scenario of using WiFi 2 GHz/5 GHz free channels, since the communication channels with limited bandwidth are shared by several different communication systems at the same time and the transmissions are undetectable between those communication systems, collisions are more likely to occur.

To reduce occurrence of collisions, effective collision detection becomes a very important issue.

SUMMARY OF THE INVENTION

It is an objective of the invention to provide efficient and effective collision detection methods.

According to an embodiment of the invention, a communication device comprises a radio transceiver and a collision detection device. The radio transceiver is configured to receive a wireless signal from a wireless communication channel. The wireless signal comprises an acknowledgment packet and the acknowledgment packet comprises acknowledgment information which corresponds to a plurality of transmitted packets. The collision detection device is coupled to the radio transceiver and configured to receive the acknowledgment packet, determine whether collision has occurred in the wireless communication channel according to the acknowledgment information corresponding to the transmitted packets and accordingly generate a detection result. The collision detection device determines whether collision has occurred according to a distribution of the acknowledgment information having a predetermined acknowledgment status in the acknowledgment packet, and when the collision detection device determines that the acknowledgment information having the predetermined acknowledgment status is concentrated in a section of the acknowledgment packet, the detection result indicates that collision has occurred.

According to another embodiment of the invention, a collision detection method comprises: receiving an acknowledgment packet, wherein the acknowledgment packet comprises acknowledgment information which corresponds to a plurality of transmitted packets; and determining whether collision has occurred in a wireless communication channel according to the acknowledgment information corresponding to the transmitted packets and accordingly generating a detection result. Step of determining whether collision has occurred in the wireless communication channel according to the acknowledgment information corresponding to the transmitted packets and accordingly generating the detection result further comprises: determining whether collision has occurred according to a distribution of the acknowledgment information having a predetermined acknowledgment status in the acknowledgment packet; and generating the detection result which indicates that collision has occurred when it is determined that the acknowledgment information having the predetermined acknowledgment status is concentrated in a section of the acknowledgment packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
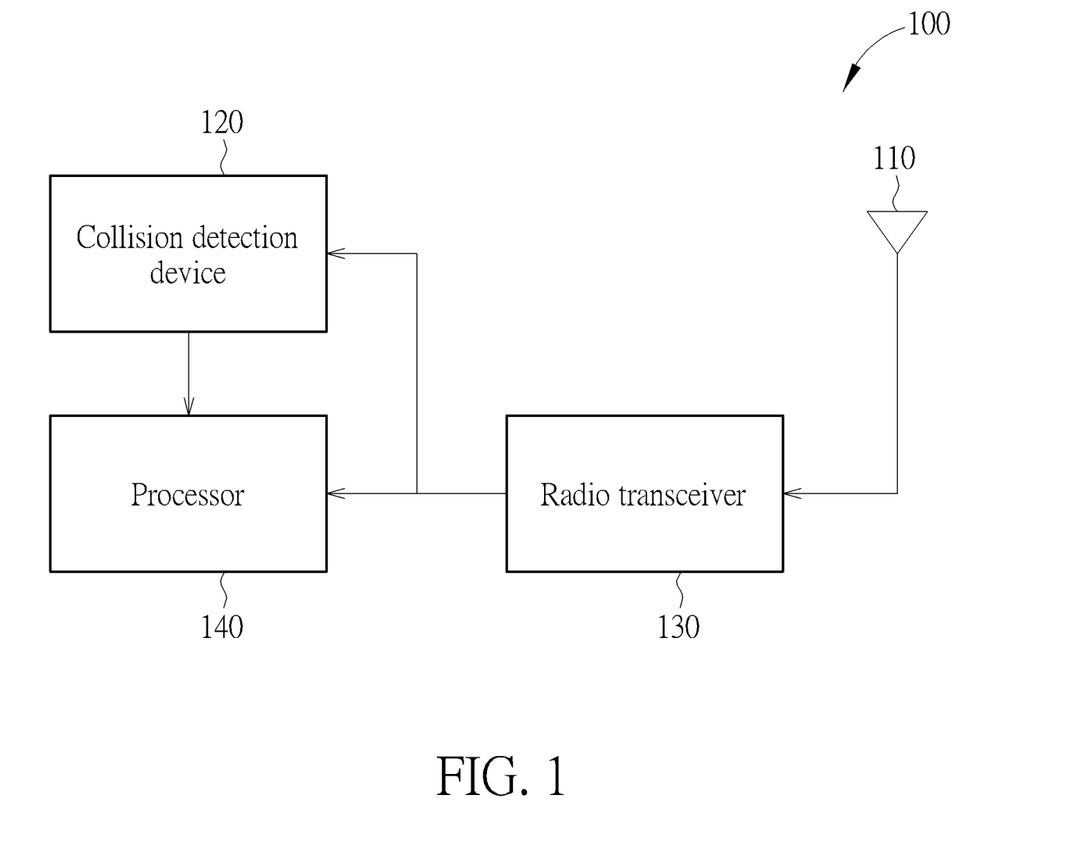
FIG. 1 shows an exemplary block diagram of a communication device according to an embodiment of the invention.

FIG. 1 shows an exemplary block diagram of a communication device according to an embodiment of the invention. The communication device 100 may comprise at least one antenna 110, a collision detection device 120, a radio transceiver 130 and a processor 140. It should be noted that, in order to clarify the concept of the invention, FIG. 1 presents a simplified block diagram of a communication device in which only the components relevant to the invention are shown. As will be readily appreciated by a person of ordinary skill in the art, a communication device may further comprise other components not shown in FIG. 1 and configured for implementing the functions of wireless communication and related signal processing.

The radio transceiver 130 is configured to transmit or receive wireless signals to or from a wireless communication channel via the antenna 110. The collision detection device 120 is coupled to the radio transceiver 130 and configured to perform collision detection according to received packets, thereby determining whether collision has occurred in the wireless communication channel. The processor 140 is coupled to the collision detection device 120 and the radio transceiver 130 and configured to adjust at least one transmission parameter according to the detection result.

In order to illustrate the operations in the invention, in FIG. 1, the collision detection device 120 is drawn outside of the radio transceiver 130 and the processor 140, so as to distinguish between the operations of collision detection, packet transmission and reception and transmission parameter adjustment. However, it should be noted that in the embodiments of the invention, the collision detection device 120 may also be implemented inside of the radio transceiver 130 or the processor 140 as a portion of the radio transceiver 130 or the processor 140, or may be implemented as an external device disposed outside of the radio transceiver 130 or the processor 140 and being independent from the radio transceiver 130 or the processor 140. Therefore, the invention is not limited to any specific implementation.

According to an embodiment of the invention, the communication device 100 may operate in compliance with the protocol as defined in the 802.11 standards. For example, the communication device 100 may be an Access Point (AP) or a Station in the wireless communication system. In the 802.11n standards, the concept of packet/frame aggregation, in which multiple packets or frames are aggregated as a large packet, is introduced. There are two types of aggregation, comprising the Aggregation Medium Access Control (MAC) Service Data Unit (A-MSDU) and Aggregation MAC Protocol Data Unit (A-MPDU).

Figure 2:
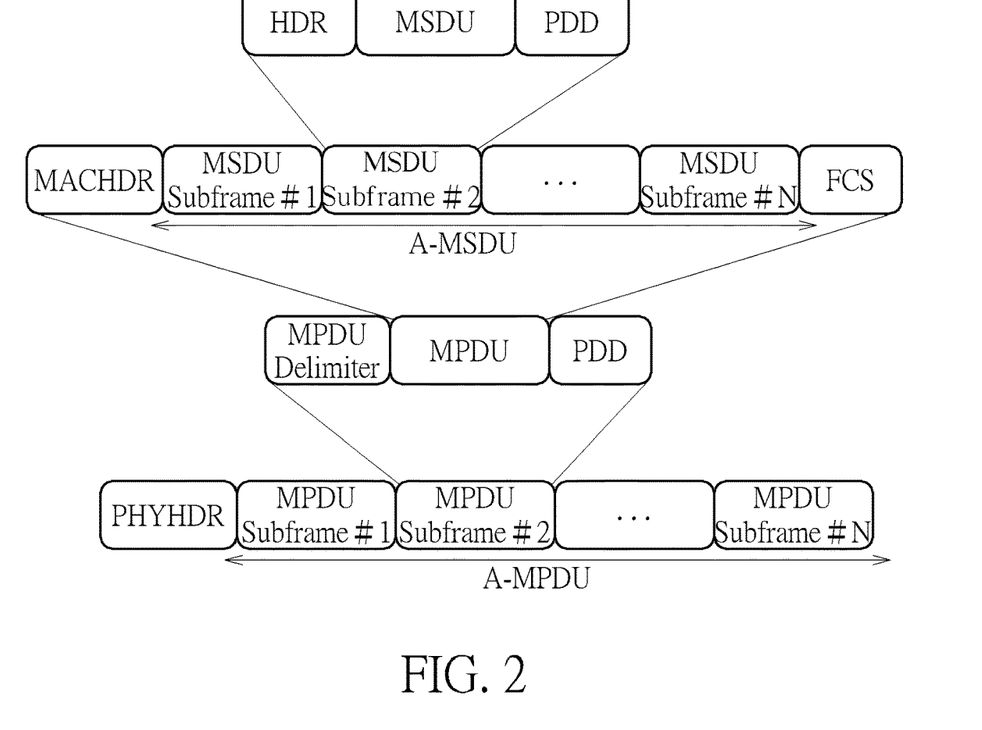
FIG. 2 is a schematic diagram showing the A-MSDU and A-MPDU.

FIG. 2 is a schematic diagram showing the A-MSDU and A-MPDU. The header HDR is added in front of the MSDU and some padding PDD is added, when necessary, in the tail of the MSDU to generate an MSDU subframe. A plurality of MSDU subframes (for example, the MSDU subframe #1—MSDU subframe #N as shown in FIG. 2) will be further aggregated to generate an A-MSDU. The header MACHDR is added in front of the A-MSDU and the Frame Check Sequence (FCS) for error detection is added in the tail of the A-MSDU to generate an MPDU. The MPDU delimiter is added in front of the MPDU and some padding PDD is added, when necessary, in the tail of the MPDU to generate an MPDU subframe (for example, the MPDU subframe #1—MPDU subframe #N as shown in FIG. 2), or named MPDU packet. Finally, the plurality of MPDU subframes will be aggregated to become an A-MPDU with the physical Header PHYHDR added in front of the A-MPDU. By transmitting multiple MPDU packets at one time in an A-MPDU, the number of preambles and headers that have to be included in each message will be greatly reduced, thereby improving the throughput of the wireless communication system.

Figure 3:
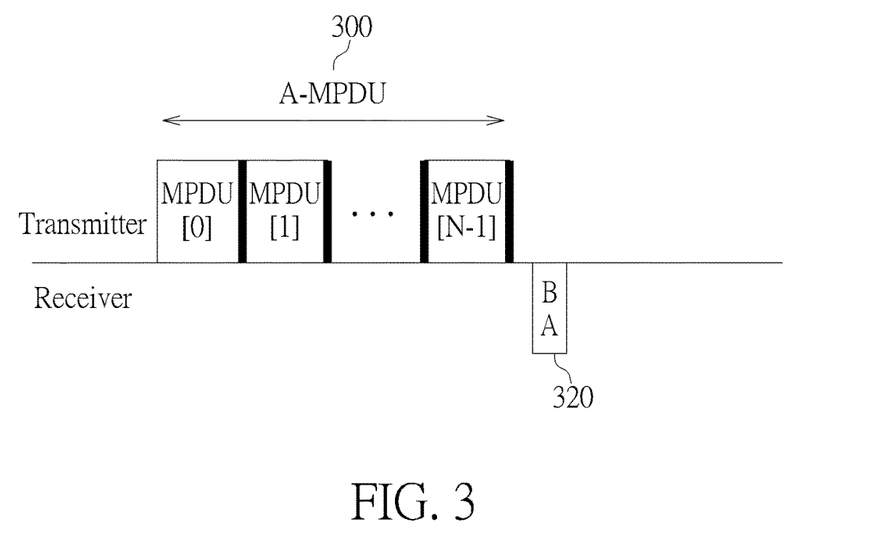
FIG. 3 is a schematic diagram showing an exemplary message flow when packet aggregation is applied.

FIG. 3 is a schematic diagram showing an exemplary message flow when packet aggregation is applied. Upon receiving an A-MPDU 300 comprising a plurality of MPDU packets (for example, the MPDU[0]~MPDU[N−1] as shown) (or named MPDU subframes) transmitted by the transmitter (for example, the communication device 100, the receiver responds a Block Acknowledgement (BA) packet 320 to the transmitter to notify the transmitter of the reception status of each MPDU packets. The Block Acknowledgement utilizes one Acknowledgement frame to carry the responses of multiple MPDU packets, so as to reduce the number of Acknowledgement frames in the application of packet aggregation.

In the embodiments of the invention, the communication device 100 may further utilize the BA packet to perform collision detection, so as to determine whether collision has occurred in the wireless communication channel, and the communication device 100 may further determine whether to adjust at least one transmission parameter according to the collision detection result.

According to an embodiment of the invention, the radio transceiver 130 may be configured to receive a wireless signal from the wireless communication channel, wherein the wireless signal may comprise an acknowledgment packet. The acknowledgment packet may comprise acknowledgment information which corresponds to a plurality of transmitted packets. The collision detection device 120 may be configured to receive the acknowledgment packet from the radio transceiver 130, determine whether collision has occurred in the wireless communication channel according to the acknowledgment information carried in the acknowledgment packet and accordingly generate a detection result. In an embodiment of the invention, the collision detection device 120 may determine whether collision has occurred according to a distribution of the acknowledgment information having a predetermined acknowledgment status. When it is determined that the acknowledgment information having the predetermined acknowledgment status is concentrated in a section of the acknowledgment packet, the collision detection device 120 generates the detection result which indicates that collision has occurred.

To be more specific, in an embodiment of the invention, the aforementioned acknowledgment packet may be the BA packet 320 shown in FIG. 3. The BA packet may comprise a BA bitmap field. The BA bitmap field may comprise a plurality of acknowledgement bits and each acknowledgement bit may correspond to one of the transmitted MPDU packets. For example, in the example shown in FIG. 3, the BA bitmap may comprise N bits (acknowledgement bits). Each acknowledgement bit may correspond to a MPDU packet aggregated in the A-MPDU. Each acknowledgement bit may be set to a predetermined acknowledgment status or a non-predetermined acknowledgment status, for example, 0 or 1, by the receiver. When the acknowledgement bit is set to the non-predetermined acknowledgment status (for example, the binary value "1"), a positive acknowledgement (Ack) may be represented, indicating that the corresponding MPDU packet is successfully received by the receiver. When the acknowledgement bit is set to the predetermined acknowledgment status (for example, the binary value "0"), a negative acknowledgement (Nack) may be represented, indicating that the corresponding MPDU packet is not successfully received by the receiver or some reception error has occurred at the receiver.

According to an embodiment of the invention, the collision detection device 120 may be configure to obtain a portion of the acknowledgement bits in the BA bitmap and configured to calculate a number of the acknowledgement bits being set to the predetermined acknowledgment status in this portion of acknowledgement bits, where the this portion of acknowledgement bits may be consecutive acknowledgement bits within the plurality of acknowledgement bits of the BA bitmap. The consecutive acknowledgement bits may be, for example, the bits arranged adjacently or consecutively in the bitmap, or may be the acknowledgement bits corresponding to the transmitted MPDU packets with consecutive numbers (for example, the aforementioned number 0~(N−1)) or consecutive indices, or corresponding to the MPDU packets being sequentially transmitted. When the number of the acknowledgement bits being set to the predetermined acknowledgment status is greater than a threshold value, the collision detection device 120 may determine that the acknowledgment information having the predetermined acknowledgment status is concentrated in a section of the acknowledgment packet. In this embodiment, the acknowledgement bit is a manifestation of the aforementioned acknowledgment information.

According to an embodiment of the invention, the collision detection device 120 may use a sliding window to sequentially select a portion of consecutive acknowledgement bits from the plurality of acknowledgement bits of the BA bitmap.

Figure 4:
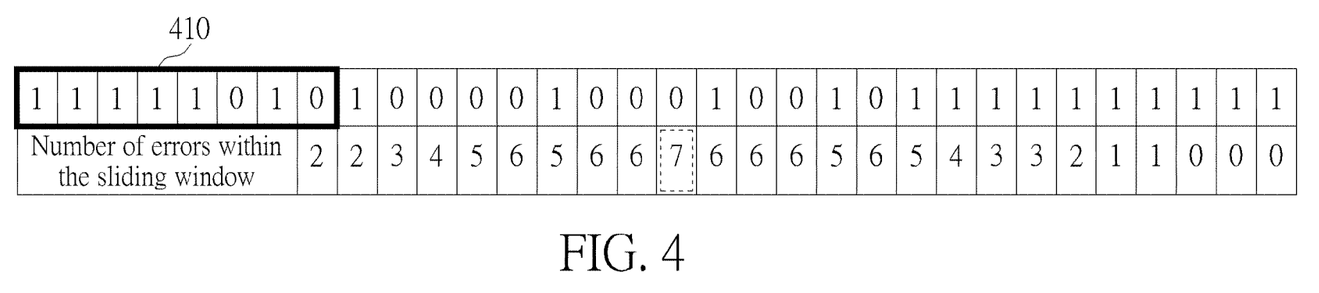
FIG. 4 shows an exemplary bitmap according to an embodiment of the invention.

FIG. 4 shows an exemplary bitmap according to an embodiment of the invention. In this example, suppose that the bitmap comprises 32 acknowledgement bits. Therefore, the length L of the bitmap may be set as L=32. The length L of the bitmap may be equal to the number of MPDU packets within an A-MPDU packet. In addition, in this example, the sliding window 410 may be designed for selecting 8 consecutive acknowledgement bits. Therefore, the length X of the sliding window 410 may be set as X=8. The collision detection device 120 may use the sliding window 410 to select 8 consecutive acknowledgement bits from the bitmap and calculate the number of the acknowledgement bits being set to the binary value "0" among the selected acknowledgement bits, thereby obtaining the number of errors within the sliding window as shown in FIG. 4. After obtaining the number of errors within the first sliding window, the collision detection device 120 may right shift or slide the sliding window 410 by one bit and repeat the operations as described above to obtain the calculation results corresponding to each slide.

Suppose that the number of errors within the sliding window is labeled as $\{S_1, S_2 \ldots S_{(L-X+1)}\}$, where the $S_i$ represents that the number of errors within the i-th sliding window. The collision detection device 120 may further determine whether there is any number of errors greater than the threshold value Err_TH. According to an embodiment of the invention, the threshold value may be designed to be related to the total number of the acknowledgement bits being set to the predetermined acknowledgment status in the bitmap. In this example, the total number M of the acknowledgement bits being set to the binary value "0" is 12, that is, M=12, and the threshold value Err_TH may be set to M*Th, where the range of the coefficient Th may be 0<Th≤1. As an example, the coefficient may be set as Th=0.5 and the threshold value may be set as Err_TH=12*0.5=6. When there is any number of errors S in the set $\{S_1, S_2 \ldots S_{(L-X+1)}\}$ being greater than the threshold value Err_TH, for example, the $S_{10}$=7>6 as shown in FIG. 4, the collision detection device 120 may determine that the errors occurred in this A-MPDU packet are overly concentrated and may determine that the overly concentrated errors may be generated due to some collision has occurred in the this A-MPDU packet. If it is determined that collision has occurred when transmitting this A-MPDU packet, this A-MPDU packet may be excluded from the A-MPDU packets which have been determined as having reception error in the determination of rate adaption or other transmission parameter adjustment (which will be described in more detailed in the following paragraphs).

Figure 5:
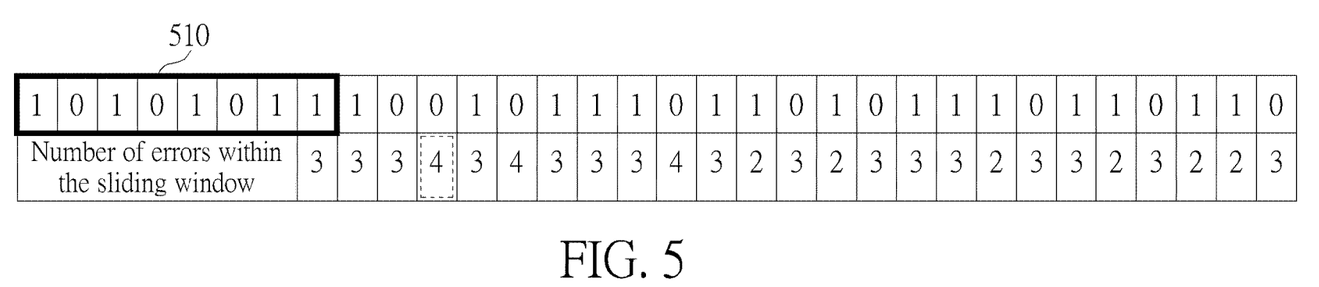
FIG. 5 shows another exemplary bitmap according to an embodiment of the invention.

FIG. 5 shows another exemplary bitmap according to an embodiment of the invention. In this example, L=32, X=8, M=12 and Th=0.5, which are the same as the previous example. However, the error distribution here is different from the previous example. Because the calculated number of errors $\{S_1, S_2 \ldots S_{(L-X+1)}\}$ are all smaller than the threshold value Err_TH, for example, the maximum number $S_4$=4<6, the collision detection device 120 may determine that the errors occurred in this A-MPDU packet are uniformly distributed, and may further determine that the uniformly distributed errors may be caused by insufficient Signal to Noise Ratio (SNR). When it is determined that collision has not occurred when transmitting this A-MPDU packet, this A-MPDU packet may be included in the determination of transmission parameter adjustment.

Figure 6:
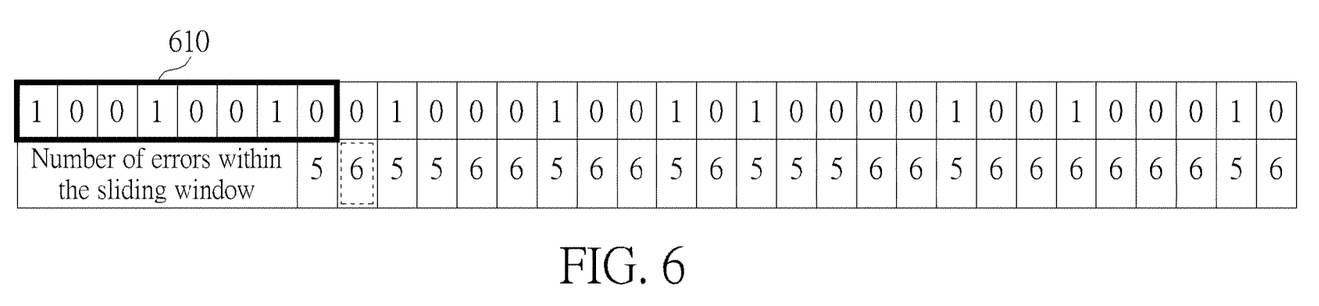
FIG. 6 shows yet another exemplary bitmap according to an embodiment of the invention.

FIG. 6 shows yet another exemplary bitmap according to an embodiment of the invention. In this example, L=32, X=8, M=22 and Th=0.5. Because the calculated number of errors $\{S_1, S_2 \ldots S_{(L-X+1)}\}$ are all smaller than the threshold value Err_TH, for example, the maximum number $S_2$=6<11, the collision detection device 120 may determine that the errors occurred in this A-MPDU packet are uniformly distributed, and may further determine that the uniformly distributed errors may be caused by insufficient SNR. When it is determined that collision has not occurred when transmitting this A-MPDU packet, this A-MPDU packet may be included in the determination of transmission parameter adjustment.

According to an embodiment of the invention, the length X of the sliding window, the coefficient Th, etc. may be dynamically adjusted according to the actual transmission parameters (for example, the Received Signal Strength Indication (RSSI), the SNR or the Error Vector Magnitude (EVM) of the received signals, the characteristic of wireless communication channel, etc.). For example, according to an embodiment of the invention, when the SNR of the received signals is large, it means that the noise in the wireless communication channel is small, thus the packet reception would be stable. For this case, the length X and the coefficient Th may be set to small values. In this manner, it will be easier to detect collision, and excessive or unnecessary transmission parameter adjustments may be avoided.

On the contrary, when the SNR of the received signals is small, it means that the noise of the wireless communication channel is large. For this case, the length X and the coefficient Th may be set to large values. In this manner, the packet reception errors are less likely to be erroneously detected or judged as collisions, and necessary transmission parameter adjustments may be performed. In other words, in an embodiment of the invention, the larger the SNR of the received signals is, the smaller the length X of the sliding window and the coefficient Th may be set, while the smaller the SNR of the received signals is, the larger length X of the sliding window and the coefficient Th may be set.

Similarly, in an embodiment of the invention, the smaller the EVM or the larger the RSSI of the received signal, the smaller the length X of the sliding window and the coefficient Th may be set, since the smaller EVM or the larger RSSI means that the packet reception would be more stable. In this manner, the sensitivity of collision detection may be increased. On the contrary, the larger the EVM or the smaller the RSSI of the received signal, the larger the length X of the sliding window and the coefficient Th may be set, to avoid misdetection of the collision.

Figure 7:
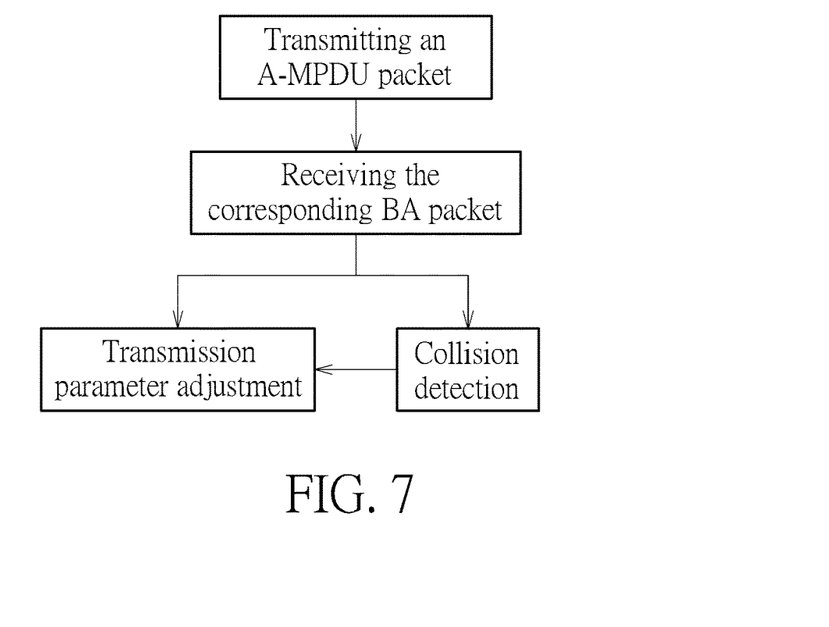
FIG. 7 is an exemplary operation flow at the transmitter according to an embodiment of the invention.

FIG. 7 is an exemplary operation flow at the transmitter according to an embodiment of the invention. The transmitter (for example, the communication device 100) may transmit at least one A-MPDU packet and may receive the corresponding BA packet. After obtaining the BA packet, the transmitter may perform collision detection and transmission parameter adjustment according to the information carried in this BA packet. In the preferred embodiments of the invention, the transmitter may use the collision detection result corresponding to each A-MPDU packet to assist the performance of transmission parameter adjustment. For example, the transmitter may correct the calculation result of packet error rate according to the collision detection result, so as to avoid excessive or unnecessary transmission parameter adjustment or to avoid the transmission parameter adjustment that does not help to improve the transmission performance.

For example, suppose that the communication device 100 has collected 10 BA packets BA1-BA10 during a time period, the collision detection device 120 may perform collision detection according to the information carried in each BA packet, to respectively determine whether collision has occurred when transmitting the corresponding A-MPDU packet and provide the detection results to the processor 140. If a detection result indicates that collision has occurred when transmitting the third A-MPDU packet, the processor 140 may exclude the third BA packet BA3 from the error packets when calculating the packet error rate, that is, the processor 140 may calculate the total number of transmitted MPDU packets and the number of MPDU packets having reception error only based on the remaining 9 BA packets. Suppose that the processor 140 counts that reception error has occurred in 300 MPDU packets of 1000 transmitted MPDU packets, where the reception error may include the cases when the packet cannot be correctly or successfully received, or others, the packet error rate calculated based on this information would be 30%. However, the processor 140 may further determine in how many packets among the 300 MPDU packets has the reception error caused by collision based on the aforementioned collision detection operations. For example, when 250 MPDU packets among the 300 MPDU packets having reception error are determined as being comprised in the A-MPDU packets in which collision has occurred, the processor 140 may recalculate the packet error rate after deducting the 250 MPDU packets to obtain a corrected packet error rate as 6.7%, and then determine how to adjust the transmission rate based on the corrected packet error rate (noted that the adjustment would be smaller than the case where the packet error rate is 30%), or may determine not to adjust the transmission rate. In this manner, the case of misjudging that the transmission rate needs to be reduced may be avoided.

In the embodiments of the invention, besides the aforementioned transmission rate, the transmission parameter may also be selected from a group comprising a contention window length, enablement of a Request to Send (RTS)-Clear to Send (CTS) mechanism, enablement of a retransmission mechanism, enablement of a frame aggregation mechanism, enablement of a transmission opportunity (TxOP) and a length of the transmission opportunity.

For example, the waiting time in the 802.11 system is a contention window generated based on a Distributed Coordination Function (DCF) Interval Frame Space (DIFS) plus a random number. In the embodiments of the invention, besides the packet error rate, the processor 140 may also calculate the packet collision rate based on the detection results. When the processor 140 determines that the packet collision rate is too high, the processor 140 may adjust the method of selecting the contention window. For example, enlarge the range of random number selection, to adjust the length of contention window, thereby reducing the collision probability.

For another example, the Request to Send (RTS)-Clear to Send (CTS) and CTS2SELF transmission/protection mechanisms have been defined in the 802.11 communication standards, but the timing of using them is not specified in the standards. In the embodiments of the invention, the processor 140 may determine whether to enable the mechanisms such as the RTS/CTS based on the detection results. For example, when the collision rate is too high, the processor 140 may determine to enable the RTS-CTS mechanism in subsequent packet transmissions.

For yet another example, since there is no Acknowledgement message associated with a broadcast or a multicast packet, the transmitter is unable to confirm whether the broadcast or a multicast packet has been successfully received by the receiver. In the embodiments of the invention, the processor 140 may determine whether to enable a retransmission mechanism for a broadcast or a multicast packet based on the detection results. For example, when the collision rate is too high, the processor 140 may determine to retransmit the broadcast or multicast packet transmissions.

For yet another example, the processor 140 may determine whether to disable the packet/frame aggregation mechanism or adequately adjust the number of aggregated packets/frames based on the detection results, so as to optimize the channel utilization. For example, when the collision rate is too high, the processor 140 may determine to disable the packet/frame aggregation mechanism or reduce the number of aggregated packets/frames.

For still another example, transmission opportunity (TxOP) is defined in the 802.11e Quality of Service (QoS) standards as a way to improve the channel utilization. The parameter "TxOP limit" represents the maximum length for one transmission. During the TxOP period, packets will be transmitted one after one without re-contending the right of using the channel. However, once collision has occurred during the TxOP period, successive collision may further occur, seriously affecting the channel utilization. In the embodiments of the invention, the processor 140 may determine whether to enable the transmission opportunity and/or whether to adjust the length of a TxOP period based on the detection results. For example, when the collision rate is too high, the processor 140 may determine to disable or not to use the transmission opportunity for subsequent transmission, or to reduce the length of a TxOP period.

Figure 8:
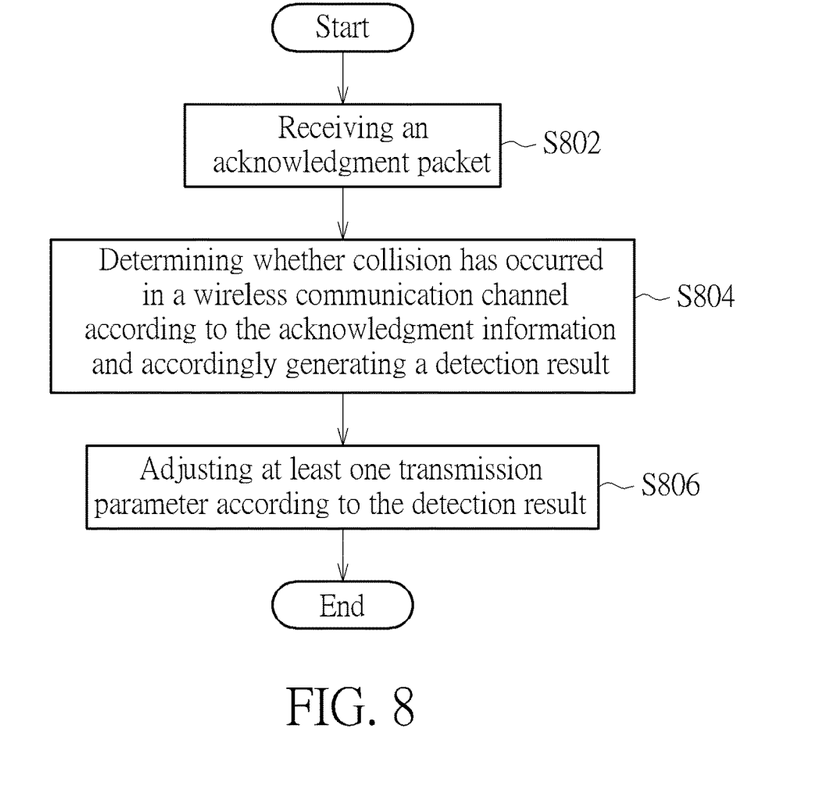
FIG. 8 is an exemplary flow chart of a collision detection and transmission parameter adjustment method according to an embodiment of the invention.

FIG. 8 is an exemplary flow chart of a collision detection and transmission parameter adjustment method according to an embodiment of the invention. The proposed collision detection and transmission parameter adjustment method comprises the following steps:

Step S802: receiving an acknowledgment packet by a communication device. The acknowledgment packet comprises acknowledgment information which corresponds to a plurality of transmitted packets.

Step S804: determining whether collision has occurred in a wireless communication channel according to the acknowledgment information corresponding to the transmitted packets and accordingly generating a detection result.

Step S806: adjusting at least one transmission parameter according to the detection result, wherein step S806 is an optional step.

In summary, the collision can be efficiently detected by analyzing the distribution of the packets in which reception error has occurred, so as to distinguish whether the reception error is caused by a collision or caused by poor transmission parameter setting. In addition, the collision detection result may be further utilized to assist the transmission parameter adjustment, so that the transmission performance can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
   a radio transceiver, configured to receive a wireless signal from a wireless communication channel, wherein the wireless signal comprises an acknowledgment packet and the acknowledgment packet comprises acknowledgment information which corresponds to a plurality of transmitted packets; and a collision detection device, coupled to the radio transceiver and configured to receive the acknowledgment packet, determine whether collision has occurred in the wireless communication channel according to the acknowledgment information corresponding to the transmitted packets and accordingly generate a detection result, wherein the collision detection device determines whether collision has occurred according to a distribution of the acknowledgment information having a predetermined acknowledgment status in the acknowledgment packet, and when the collision detection device determines that the acknowledgment information having the predetermined acknowledgment status is concentrated in a section of the acknowledgment packet, the detection result indicates that collision has occurred.

2. The communication device of claim 1, further comprising:
a processor, coupled to the collision detection device and configured to adjust at least one transmission parameter according to the detection result.

3. The communication device of claim 1, wherein the acknowledgment packet is a Block Acknowledgement (BA) packet comprising a BA bitmap field, the BA bitmap field comprises a plurality of acknowledgement bits and each acknowledgement bit corresponds to one of the transmitted packets.

4. The communication device of claim 3, wherein each acknowledgement bit is set to the predetermined acknowledgment status or a non-predetermined acknowledgment status, the collision detection device is configured to calculate a number of the acknowledgement bits being set to the predetermined acknowledgment status in at least a portion of consecutive acknowledgement bits within the plurality of acknowledgement bits, and when the number of the acknowledgement bits being set to the predetermined acknowledgment status is greater than a threshold value, the collision detection device determines that the acknowledgment information having the predetermined acknowledgment status is concentrated in a section of the acknowledgment packet.

5. The communication device of claim 4, wherein the collision detection device is further configured to calculate a total number of the acknowledgement bits being set to the predetermined acknowledgment status in the plurality of acknowledgement bits of the acknowledgment packet, and wherein the threshold value is related to the total number of the acknowledgement bits being set to the predetermined acknowledgment status in the plurality of acknowledgement bits of the acknowledgment packet.

6. The communication device of claim 4, wherein the collision detection device is configured to use a sliding window to select said at least a portion of consecutive acknowledgement bits from the plurality of acknowledgement bits.

7. The communication device of claim 4, wherein said consecutive acknowledgement bits correspond to multiple packets with consecutive numbers in the transmitted packets.

8. A collision detection method, comprising:
receiving an acknowledgment packet, wherein the acknowledgment packet comprises acknowledgment information which corresponds to a plurality of transmitted packets; and determining whether collision has occurred in a wireless communication channel according to the acknowledgment information corresponding to the transmitted packets and accordingly generating a detection result, wherein step of determining whether collision has occurred in the wireless communication channel according to the acknowledgment information corresponding to the transmitted packets and accordingly generating the detection result further comprises:

determining whether collision has occurred according to a distribution of the acknowledgment information having a predetermined acknowledgment status in the acknowledgment packet; and generating the detection result which indicates that collision has occurred when it is determined that the acknowledgment information having the predetermined acknowledgment status is concentrated in a section of the acknowledgment packet.

9. The collision detection method of claim 8, wherein the acknowledgment packet is a Block Acknowledgement (BA) packet comprising a BA bitmap field, the BA bitmap field comprises a plurality of acknowledgement bits and each acknowledgement bit corresponds to one of the transmitted packets.

10. The collision detection method of claim 9, wherein each acknowledgement bit is set to the predetermined acknowledgment status or a non-predetermined acknowledgment status, and step of determining whether collision has occurred according to the distribution of the acknowledgment information having the predetermined acknowledgment status in the acknowledgment packet further comprises:

calculating a number of the acknowledgement bits being set to the predetermined acknowledgment status in at least a portion of consecutive acknowledgement bits within the plurality of acknowledgement bits; and determining that the acknowledgment information having the predetermined acknowledgment status is concentrated in a section of the acknowledgment packet when the number of the acknowledgement bits being set to the predetermined acknowledgment status is greater than a threshold value.

11. The collision detection method of claim 10, wherein the threshold value is related to a total number of the acknowledgement bits being set to the predetermined acknowledgment status in the plurality of acknowledgement bits of the acknowledgment packet.

12. The collision detection method of claim 10, further comprising:
using a sliding window to select said at least a portion of consecutive acknowledgement bits from the plurality of acknowledgement bits.

13. The collision detection method of claim 10, further comprising:
adjusting at least one transmission parameter according to the detection result.

14. The collision detection method of claim 10, wherein said consecutive acknowledgement bits correspond to multiple packets with consecutive numbers in the transmitted packets.

* * * * *

UNITED STATES PATENT AND TRADEMARK OFFICE
CERTIFICATE OF CORRECTION

PATENT NO. : 11,589,391 B2
APPLICATION NO. : 17/521789
DATED : February 21, 2023
INVENTOR(S) : Wei-Chi Lai et al.

It is certified that error appears in the above-identified patent and that said Letters Patent is hereby corrected as shown below:

On the Title Page

Item (30), delete "11010590" and insert --110105902--.

Signed and Sealed this
Eighteenth Day of April, 2023

Katherine Kelly Vidal
*Director of the United States Patent and Trademark Office*